June 17, 1930.  J. BIBBY  1,763,842
MACHINE COUPLING
Filed July 19, 1928
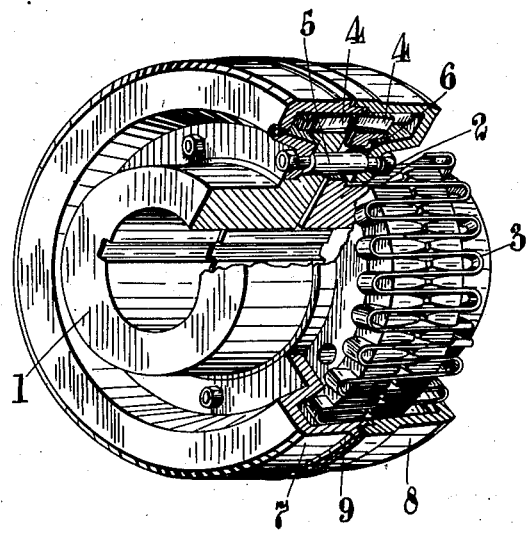
INVENTOR
JAMES BIBBY
BY *Ralph W. Brown*
ATTORNEY

Patented June 17, 1930

1,763,842

UNITED STATES PATENT OFFICE

JAMES BIBBY, OF LONDON, ENGLAND, ASSIGNOR TO THE FALK CORPORATION, OF MILWAUKEE, WISCONSIN, A CORPORATION OF WISCONSIN

MACHINE COUPLING

Application filed July 19, 1928, Serial No. 293,841, and in Great Britain July 19, 1927.

This invention relates to machine shaft couplings of the kind comprising grid-like resilient inter-connecting members the limbs of which bridge and lie removably in axially directed grooves in the peripheries of the coupled parts and are surrounded by a casing or shell. In such couplings it is desirable, particularly at high speeds, to have every part run truly with one or other of the two shafts so that even if the shafts are or become out of line the coupling as a whole will remain dynamically balanced. The chief object of the present invention is to ensure this condition of working in machine shaft couplings of the kind referred to.

With the above object in view the coupling according to the present invention consists of shaft-coupling members having axially directed peripheral grooves, grid-like resilient interconnecting means having their limbs bridging and lying removably in said grooves, and a grease or oil casing therefor secured entirely to only one of said members so that even when the shafts are out of alignment the aforesaid parts of the coupling continue to run truly in balance with one or other of the two shafts.

The invention will now be explained more fully with reference to the accompanying drawing which illustrates in perspective the embodiment of the invention in a shaft coupling of the kind referred to, such a coupling being described and illustrated in the specification of my prior United States Patent No. 1,391,713, and an important feature thereof being the contour of the side walls of the grooves in the coupling members as fully explained in the aforesaid specification.

In the constructional form of coupling illustrated in the accompanying drawing the two coupling members 1 and 2 keyed to the two shafts (not shown) to be coupled are suitably grooved in the axial direction at their periphery as at 4 to accommodate the limbs of the grid-like spring or springs 3 which merely lie in and bridge said grooves and are not anchored to either of the coupling members. As the springs 3 require to be lubricated and kept in position, they are closely enveloped by a suitable casing or shell. As shown, this shell is made in halves 7 and 8, although it may be in more parts, with one or more circumferential joints. The shell halves are jointed together at the circumferential joint 9 and are held together by the shouldered bolts 5. These bolts may also serve to secure the complete shell rigidly to the single coupling member 1, but are kept clear of the other coupling member by the holes 6 being sufficiently large to allow for all want of alignment of the coupling members.

Instead of the bolts 5 being used to secure the entire shell to the coupling member 1, other short bolts or studs may be provided for holding the half shell 7 to the coupling member 1. In any event the entire shell 7, 8, is carried by the single coupling member 1, and therefore runs true therewith on its shaft, leaving the other coupling member 2 to run true on the other shaft.

Moreover, owing to the maintenance of true running of the entire shell 7, 8, with the shaft of coupling member 1, the interconnecting springs 3—being closely enveloped by the entire shell 7, 8—also run true with the shaft of coupling member 1, and in the event of any departure from alignment the interconnecting springs 3 remain with the entire shell and undergo no radial distortion.

What I claim is:—

1. A machine shaft coupling comprising aligned shaft coupling members having axially directed peripheral grooves, grid-like inter-connecting resilient means having their limbs bridging and lying removably in said grooves, comprising two circumferentially jointed halves enclosing respectively the peripherally grooved portions of the shaft coupling members, and means securing both halves of the casing together but to only one of the coupling members.

2. A machine shaft coupling comprising aligned shaft coupling members having axially directed peripheral grooves, grid-like inter-connecting resilient means having their limbs bridging and lying removably in said grooves, comprising two circumferentially jointed halves enclosing respectively the peripherally grooved portions of the shaft coupling members, and bolts securing one half-casing to one shaft coupling member and extending through enlarged bolt holes in the other coupling member to engage the other half-casing, whereby the entire casing is secured to only one coupling member and permits slight relative movement between the two coupling members.

In testimony whereof I have signed my name to this specification.

JAMES BIBBY.